Oct. 18, 1966  R. E. CURRAN  3,278,957
FAUCET STEM JIG
Filed Oct. 20, 1965

INVENTOR.
ROBERT E. CURRAN
BY Jerome Bauer
ATTORNEY.

United States Patent Office 3,278,957
Patented Oct. 18, 1966

3,278,957
FAUCET STEM JIG
Robert E. Curran, 56 Grandview St., Huntington, N.Y.
Filed Oct. 20, 1965, Ser. No. 498,373
3 Claims. (Cl. 10—1)

This application is a continuation-in-part of copending application Serial No. 307,520, filed on September 9, 1963, entitled Combination Drilling and Tapping Jig, now Patent No. 3,224,012 issued December 21, 1965.

This invention relates to jigs and in particular to a jig for drilling and removing a bib screw that has broken off in the end of a facet stem and for retapping the drilled hole for the reception of another bib screw.

A conventional faucet stem is constructed with an end that normally mounts a washer. The washer is usually held in place on the end of the faucet stem by a bib screw. During use, the washer wears and from time to time, it becomes necessary to replace it. The replacement is accomplished by first removing the bib screw. Unfortunately, however, the minerals in the water chemically react with the metal of the bib screw such that the screw often becomes brittle and disintegrates or breaks off when any pressure is applied to it during an attempt at its removal from the faucet stem. Many times, this renders the faucet stem unless that part of the bib screw remaining in the stem can be removed and the threads retapped.

Accordingly, an object of the invention is to provide a jig that will securely hold a faucet stem while a drill is guided to drill a hole in the stem for the removal of that part of the rib screw remaining therein and for guiding a tap for the rethreading of the drilled hole.

Still another object of the invention is to provide a jig that is relatively small in size, comparatively light in weight and, therefore, sufficiently portable that it may be carried about by the plumber as another one of his conventional tools, thereby enabling the plumber to perform the redrilling and retapping of the faulty stem at the job site.

A further object of the invention is to provide a jig for the redrilling and retapping of faucet stems of different sizes and lengths of the types conventionally used and found in home and office buildings.

Figure 1:
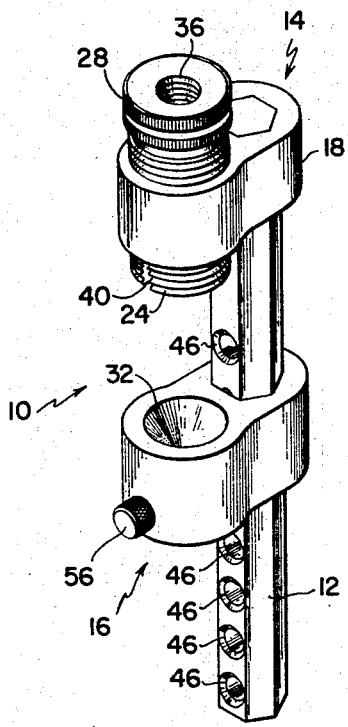
Figure 2:
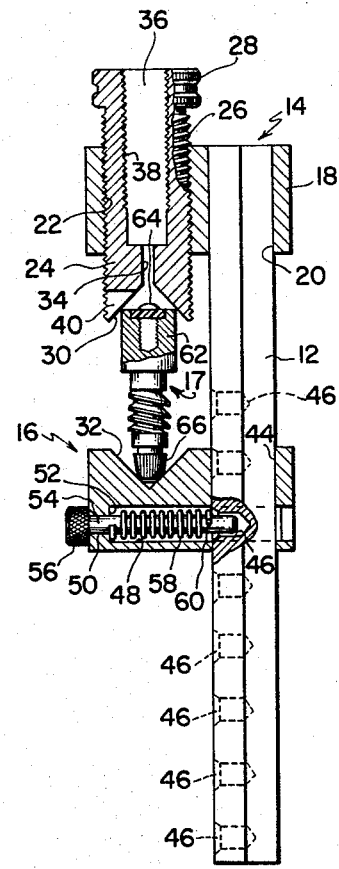
Figure 3:
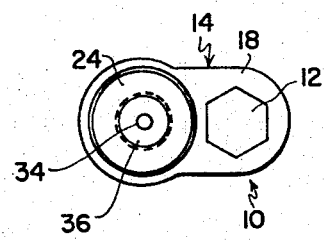

Other and further objects of this invention reside in the structures and arrangements hereinafter more fully described with reference to the accompanying drawing in which:

FIG. 1 is a perspective view of a jig constructed according to the present invention, FIG. 2 is a partial vertical sectional view of the jig of FIG. 1, showing the parts thereof in condition for drilling a hole in a workpiece, and FIG. 3 is a top plan view.

The jig of the present invention is designated generally by the numeral 10 in the figures and includes an elongated member 12 having a substantially hexagonal cross-sectional area. An upper clamping member 14 is connected to the top of the elongated member and a base clamping member 16 is slidably mounted on the elongated member 12. The upper clamping top member 14 and the base clamping member 16 are adapted to engage and hold a workpiece, such as a faucet stem 17, therebetween and from movement relative to the elongated member 12.

More specifically, the upper clamping member 14 includes a clamp 18 having hexagonal through aperture 20 that fixedly receives the top portion of the elongated member 12 therein in a press fit, for example. Provided in the clamp 18 is an internal threaded through bore 22 having an axis parallel to the axis of the aperture 20 and laterally off-set therefrom. Movably received within the bore 20 is a top member 24 having an external threaded wall 26 threadedly engaging the internal threaded bore 22 so that rotation of the top member 24 affects axial movement thereof. The top member 24 is provided with a knurled knob 28 at the top thereof to facilitate rotation of the member 24. Accordingly, the top member 24 is laterally off-set from the elongated member 12 and is adjustable relative to the elongated member 12 to vary the distance between the top member 24 and the base clamping member 16.

Both the top member 24 and the base clamping member 16 are provided with opposed coaxial conically shaped interior engaging guide surfaces 30 and 32, respectively. The top member 24 is provided with an opening 34 that functions as a guide for a tapping tool. The opening 34 is positioned at the center of the top member 24 and, therefore, is located at the apex portion of the conical guide surface 30. The opening 34 is a through opening in that it extends fully through the top member 24 and thereby functions as a tap opening for guiding the movement of a tap tool therethrough for axial alignment and engagement with a workpiece faucet stem that is adapted to be positioned in the jig 10 in the manner described below.

The center of the top member 24 is hollowed at 36 in alignment with the tap guide opening 34. The hollowed center 36 may be threaded as shown at 38 or provided with other suitable complementary engaging means that are provided on a drill guide bushing that is adapted to be inserted into the top member. For purposes of clarity, the drill guide bushing is not shown since the same forms no part of this invention. The lower end of the member 24 is provided with a slot 40 entering into the conical seat 30. This is to enable drill and tap chips to be emptied from within the seat when a faucet stem 17 is held therein as will be described.

The base clamping member 16 is provided with a hexagonal through aperture 44 that slidingly receives the elongated member 12 therethrough. The axis of the conical surface 32 of the base member 16 is parallel to and laterally off-set from the axis of the aperture 44.

Provided in one face of the hexagonical member 12 is a row of longitudinal spaced transversely extending apertures 46. A bore 48 extends transversely through the base clamping member 16, the axis of the bore 48 being perpendicular to the axis of the aperture 44. The bore 48 includes a narrow-neck portion 50 that defines a shoulder 52 with the enlarged diameter section of the bore. Slidably received within the bore 48 and extending through the portion 50 in engagement therewith is a stop pin 54 that terminates in an enlarged diameter head 56. The stop pin 54 is sized to slidably extend into and engage a preselected one of the respective apertures 46 to prevent movement of the base clamping member 16 relative to the elongated member 12. A spring 58 is connected to the stop pin 54 at 60 and abuts the shoulder 52 at the other end thereby to bias the stop pin 54 into engagement with the preselected one of the apertures 46.

In actual use, when a faucet stem 17, such as that illustrated in FIG. 2 is required to be drilled to remove its broken bib screw, the same is inserted into the jig 10. This is accomplished by first grasping the head 56 of the stop pin 54 and withdrawing the pin outwardly, against the bias of the spring 58, until the stop pin clears the previously engaged aperture 46 and permits the base clamping member 16 to slide along the member 12 to the approximate length of the stem 17.

When the base clamping member 16 is located at the desired position along the length of the support member 12, the pin 54 is released permitting the spring 58 to return it to the member 12. If the pin 54 is then aligned with a desired one of the apertures 46, it will seat in and engage the same by virtue of the spring force acting against it. If the pin 54 is not accurately aligned with an aperture 46, slight sliding movement of the clamping member 16 along the support member 12 will cause the pin to slide along the same until it is aligned with the desired aperture, and then, because each aperture has an enlarged entrance, it will snap into the aperture and is there retained by the spring 58 until manually disengaged therefrom.

In use, the faucet stem 17 is inserted between the upper and lower clamp members 14 and 16 with its washer containing end 62 seated against and engaging the conical seating surface 30 and its bib screw 64 facing the tap guide opening 34. The handle receiving end 66 of the stem 17 similarly seats against the conical seating surface 32 of the base clamp 16. The stem 17 is then securely clamped between the conical surfaces 30 and 32 by threading the top member 24 into the clamp element 18 until it tightly engages the stem between the conical surfaces. If the stem 17 was accidentally inserted out of alignment between the clamp members, this is automatically corrected during the tightening of the top member 24 because as the conical surfaces 30 and 32 are moved relative to each other, they cause the portions of the stem engaged thereby to align with a line drawn through their apices. During the clamping of the stem 17, the base member 16 is held fixedly in place to its preselected position on the support 12 by the stop pin 54.

A drill guide bushing, not shown, is adapted to be threaded into engagement with the threads 38 in the top member 24. The drill guide bushing will have a properly dimensioned hole to guide a drill into precise alignment with the bib screw 64 of the now clamped stem 17. After the bib screw is drilled out of the stem, the drill guide bushing is unthreaded from the member 24 to provide direct access to the tap guide opening 34. A tap is then inserted through the opening and the drilled hole is tapped for a new screw.

After the hole has been retapped, the tap is removed and the top member 24 is unthreaded slightly from engagement with its adjacent end of the faucet stem 17. This relieves the pressure against the base clamping member 16. Accordingly, because the pressure is relieved from the stop pin 54, it can now be manually pulled out of and removed from its aperture 46, thereby permitting the base clamping member 16 to slide down the elongated member 12. The faucet stem 17 may now be removed from the jig 10 and is ready for reuse.

Those skilled in the art will readily recognize that the present invention will accommodate faucet stems of different sizes and lengths of the type conventionally found in the home and most office buildings. Such faucet stems are accommodated in the present invention by the selective rapid adjustment of the stop pin 54 to engage in the appropriate aperture 46 to selectively position the base clamping member 16 variously along the length of the elongated member 12. This adjustment is accomplished quickly and thereby simply and merely requires a few turns for adjustment of the top member 24 in order to automatically accurately position and lock the faucet stem 17 between its conical guiding surface 30 and the conical guiding surface 32 of the base clamping member 16.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:
1. A jig for performing work on variously sized faucet stems, including
an elongated member,
a base connected to said elongated member having a conical surface laterally offset therefrom,
a top member having a conical surface,
connecting means for connecting said top member to said elongated member so the conical surface thereof is opposite to and coaxial with the conical surface of the base,
said base and said top member being movable relative to each other to engage and hold the opposite ends of a stem centered therebetween from movement relative to said elongated member,
a through bore in said top member providing for the insertion of a tool therethrough for working cooperation with the stem, a through aperture in said base receiving said elongated member in a sliding engagement,
complementary formed engaging means on said base and said elongated member cooperable with each other to releasably clamp said base in preselected positions on said elongated member,
wherein said engaging means includes a row of spaced apertures in said elongated member,
a pin slidingly received through said base for selective engagement with a preselected one of said row of apertures,
and biasing means connected to said pin for biasing said pin into engagement with said preselected aperture.

2. A jig as in claim 1,
wherein said connecting means comprises a clamp fixedly mounted on said elongated member, and a through bore in said clamp having means threadely engaging said top member, whereby rotation of said top member in a preselected direction relative to said clamp causes movement of said top member toward said base.

3. A jig for performing work on variously sized faucet stems, including
an elongated member,
a base connected to said elongated member having a conical surface laterally offset therefrom,
a top member having a conical surface,
connecting means for connecting said top member to said elongated member so the conical surface thereof is opposite to and coaxial with the conical surface of the base,
said base and said top member being movable relative to each other to engage and hold the opposite ends of a stem centered therebetween from movement relative to said elongated member,
a through bore in said top member providing for the insertion of a tool therethrough for working cooperation with the stem,
a through aperture in said base receiving said elongated member in a sliding engagement,
complementary formed engaging means on said base and said elongated member cooperable with each other to releasably clamp said base in preselected positions on said elongated member,
and wherein said elongated member has a non-circular cross-sectional area.

References Cited by the Examiner
UNITED STATES PATENTS

| | | | |
|---|---|---|---|
| 1,114,531 | 10/1914 | Rutz | 77—13 |
| 2,719,461 | 10/1955 | Hawker | 77—13 X |
| 2,967,053 | 1/1961 | Nowak | 269—288 X |
| 3,224,021 | 12/1965 | Curran | 10—147 X |

ANDREW R. JUHASZ, *Primary Examiner.*